(12) United States Patent
Lawrence (10) Patent No.: US 10,270,827 B2
(45) Date of Patent: Apr. 23, 2019

(54) TELEMETRY BASED FEEDBACK FOR IMPROVED MEDIA STREAMING

(71) Applicant: Intel Corporation, Santa Clara, CA (US)

(72) Inventor: Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 14/977,304

(22) Filed: Dec. 21, 2015

(65) Prior Publication Data

US 2017/0180442 A1    Jun. 22, 2017

(51) Int. Cl.
| H04L 29/06 | (2006.01) |
| --- | --- |
| H04L 29/08 | (2006.01) |
| H04W 24/02 | (2009.01) |
| H04W 24/08 | (2009.01) |
| H04W 84/12 | (2009.01) |

(52) U.S. Cl.
CPC ............ *H04L 65/601* (2013.01); *H04L 65/80* (2013.01); *H04L 67/104* (2013.01); *H04L 67/18* (2013.01); *H04L 67/322* (2013.01); *H04W 24/02* (2013.01); *H04W 24/08* (2013.01); *H04W 84/12* (2013.01)

(58) Field of Classification Search
CPC ..... H04L 65/601; H04L 67/104; H04L 65/80; H04L 67/18; H04L 67/322; H04W 24/02; H04W 24/08; H04W 84/12
See application file for complete search history.

(56) References Cited

U.S. PATENT DOCUMENTS

| 2011/0032822 A1* | 2/2011 | Soomro | ................ H04W 72/10 |
| --- | --- | --- | --- |
| | | | 370/230 |
| 2012/0297051 A1* | 11/2012 | Kakadia | ................ H04L 43/026 |
| | | | 709/224 |
| 2013/0142038 A1* | 6/2013 | Pan | ......................... H04L 47/25 |
| | | | 370/230 |
| 2014/0173022 A1* | 6/2014 | Morrison, III | ...... H04L 67/1063 |
| | | | 709/217 |

(Continued)

OTHER PUBLICATIONS

International Search Report and Written Opinion dated Mar. 24, 2016 from International Application No. PCT/US2016/063147, 13 pages.

*Primary Examiner* — Michael C Lai
(74) *Attorney, Agent, or Firm* — Schwabe, Williamson & Wyatt, P.C.

(57) ABSTRACT

Apparatuses, methods and storage medium associated with telemetry based feedback for improved media streaming are disclosed herein. In embodiments, an apparatus may include one or more processors, devices, and/or circuitry to obtain telemetry data corresponding to a plurality of sources, and to utilize the telemetry data to determine whether neighboring peer-to-peer wireless media streams associated with the plurality of sources are to operate at a same time on a same channel or are presently operating at the same time on the same channel. The one or more processors, devices, and/or circuitry may be to transmit signaling associated with a channel change recommendation in response to determining that the neighboring peer-to-peer wireless media streams are to operate at the same time on the same channel or are presently operating at the same time on the same channel. Other embodiments may be described and/or claimed.

18 Claims, 4 Drawing Sheets

(56) References Cited

U.S. PATENT DOCUMENTS

| | | | | |
|---|---|---|---|---|
| 2014/0297735 A1* | 10/2014 | Aoyagi | ................ | H04L 67/108 709/203 |
| 2015/0351114 A1* | 12/2015 | Wolf | .................. | H04L 67/1085 370/330 |
| 2016/0066137 A1* | 3/2016 | Kulkarni | ................ | H04W 4/02 455/456.1 |

* cited by examiner

TELEMETRY BASED FEEDBACK FOR IMPROVED MEDIA STREAMING

TECHNICAL FIELD

The present disclosure relates to the field of electronic circuits and communication. More particularly, the present disclosure relates to peer-to-peer wireless media streaming with telemetry based feedback.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A display device may be coupled to computing device via a cable to display media played on the computing device on the display device. For instance, an HDMI cable may be connected to an HDMI output of a laptop, and an HDMI input of a television or monitor, or an intermediary device such as an AV received coupled to a television or monitor. The HDMI connection may allow media played on laptop to be output on the display device.

Peer-to-peer media wireless streaming can perform a similar functionality for media (movies, music, or the like), but without the cable. For example, Miracast®, which may be sometimes referred to as "HDMI over Wi-FI", defines a protocol to connect an electronic device (e.g., an external monitor or television) to a computing device (e.g., a laptop, a smartphone, or the like) for displaying media played by the computing device on the electronic device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with telemetry based feedback for improved media streaming, e.g., wireless display Quality of Service (QoS), are disclosed herein. In embodiments, an apparatus may include one or more processors, devices, and/or circuitry to obtain telemetry data corresponding to a plurality of sources, and to utilize the telemetry data to determine whether neighboring peer-to-peer wireless media streams associated with the plurality of sources are to operate at a same time on a same channel, e.g., a wireless technology streaming technology channel (such as WiFi, Radio Frequency (RF), or the like), or are presently operating at the same time on the same channel. The one or more processors, devices, and/or circuitry may be to transmit signaling associated with a channel change recommendation in response to determining that the neighboring peer-to-peer wireless media streams are to operate at the same time on the same channel or are presently operating at the same time on the same channel, thereby improving the media streaming, e.g., wireless display QoS.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Some wireless media display data streams, e.g. Miracast, are allocated maximum Quality of Service (QoS) priority to ensure smooth glitch free AV playback over the remote screen/speakers. In congested WiFi consumer environments there is high probability that there will be neighboring Access Points (AP) on the same WiFi channel. The Personal Area Network (PAN) WiDi/Miracast channel may be determined by the Wireless Local Area Network (WLAN) channel. As a result there will be high probability of neighboring WiDi/Miracast streams on the same channel due to the neighboring APs being on the same channel. Since all Miracast streams are set to maximum QoS, there may be significant interference between streams resulting in very bad AV playback, significantly affecting user experience for all users.

APs may have their internal/proprietary algorithms to move to other channels that are free compared to the current channel. The effectiveness of this will depend on the model of the AP. However, this may not guarantee optimum QoS for WiDi/Miracast for WiDi streaming QoS and is generally based on signal strength of neighboring APs.

In some embodiments, WiDi telemetry data may be used to collectively determine the best channel options for all the WiDi/Miracast users at a given location. A network device (e.g. a server) may use the location of the user, the fact that they are streaming WiDi/Miracast, and the AP WLAN and PAN channel information to collectively provide feedback to WiDi users at a given location with options to optimally improve the WiDi QoS—such as switching to other channels that are free from the influence of neighboring WiDi Miracast streams.

Figure 1:
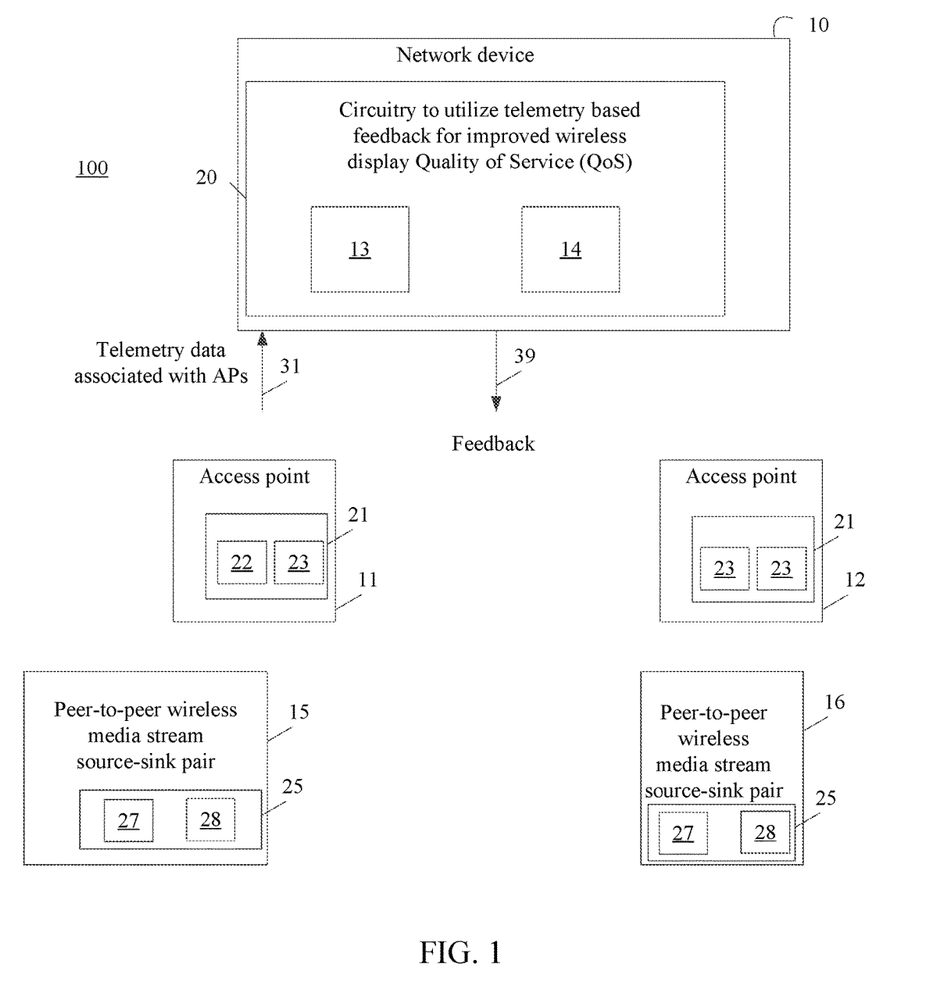
FIG. 1 illustrates a system utilizing telemetry based feedback for improved media streaming, according to some embodiments.

FIG. 1 illustrates a system utilizing telemetry based feedback for improved media streaming, according to some embodiments.

System 100 may include a network device 10 (e.g., a server), access points 11 and 12, and peer-to-peer wireless media stream source-sink pairs 15 and 16. The network device 10 may include circuitry 20 to analyze received telemetry data 31 and generate feedback 39 for better QoS. The access points 11 and 12 and/or the peer-to-peer wireless media stream source-sink pairs 15 and 16 may include circuitry 21 and 25, respectively, to perform operations associated with a channel change in response to the feedback 39.

In an example, one of the peer-to-peer wireless media stream source-sink pairs 15 and 16 may include a computing device for playing media and an electronic device. The computing device may include a processor featuring Intel® Wireless Display, or a WiDi adapter. The electronic device may include a television, monitor, projector, set top box (coupled to a display), or the like, having Intel WiDi built in, or may include a WiDi adapter plugged into a display.

The circuitry 20 of the network device 10 may be configured to obtain telemetry data corresponding to a plurality of sources, e.g., access points 11 and 12. In some known WiDi/Miracast solutions systems, analytical information that is available to the Miracast source is uploaded at regular intervals to the Miracast solution provider's server. In some known Intel Miracast solutions, such as Intel's WiDi 6.0 version, telemetry capability is provided. For instance, in an example Intel's WiDi 6.0 version system, diagnostic and analytic data are obtained for the Miracast session and sent to servers using Telemetry infrastructure of the system. WiFi channel and AP information may form part of this data.

In some examples, the telemetry data collected by the individual sources and uploaded to the telemetry server includes source location information, an indication of whether WiDi is being used, and WLAN and WPAN Channel information. In some examples, a telemetry data analyzer component of the circuitry 20 may include a telemetry data analyzer component 13 configured to analyze this information. Part of this analysis may include mapping of WiDi/Miracast users at a given location along with the channel numbers that they are using. In an example, the telemetry data analyzer component 13 may be configured to determine, using telemetry data corresponding to a plurality of sources, whether neighboring peer-to-peer wireless media streams associated with the plurality of sources are to operate at a same time on a same channel or are presently operating at the same time on the same channel.

Once this map is available to the server, in some examples, a QoS Improvement Feedback Provided (QIFP) component of the circuitry 20 may determine the best channel a Miracast user should use with minimum interference from neighboring Miracast streams. The circuitry 20 may include a feedback component 14 to generate feedback 39 including a recommendation or a command for a channel change. In an example, the feedback component 14 is configured to output signal associated with a channel change recommendation in response to determining that the neighboring peer-to-peer wireless media streams are to operate at the same time on the same channel or are presently operating at the same time on the same channel.

Once each individual source receives the QIFP recommendation, a channel change may be recommended and/or executed. In one example, the access points 11 and 12 are Dual Channel Mode (DCM) capable access points. DCM capability is a known feature on some WiFi NICs), and may allow the WPAN and WLAN to operate on separate channels. In such an example, the circuitry 21 may utilize the QIFP recommendation as a guide to set the channel based the Miracast/WiDi usage environment at the corresponding location. This can be done automatically (without the user knowing) by configuration to the NIC via the WiDi/Miracast application/stack, or non-automatically by allowing the user to change the channel if exposed to him/her by the WiFi user interface. If a channel is changed automatically or by the user, the probability of improvement of WiDI/Miracast QoS may improve significantly.

In another example where the access points 11 and 12 are not DCM capable access points, the circuitry 20 may be configured to recommend to the user to change the channel of the AP. A user may perform the channel change via the AP user interface. If a channel is changed by the user, the probability of improvement of WiDI/Miracast QoS may improve significantly.

In an example, the circuitry 21 may include a network interface 27 including a Wireless Local Area Network (WLAN) interface, the network interface to receive feedback signaling including a channel change recommendation. The circuitry 21 may include a processing component 28 to determine whether to perform a first predetermined operation responsive to the channel change recommendation, and in response to determining to not perform the first predetermined operation, perform a second different predetermined action. One of the predetermined operations may include outputting a user notification for utilizing a user interface of a respective one of the sources to perform a channel change. In an example, the circuitry 25 may include a network interface 27 including a Wireless Local Area Network (WLAN) interface, the network interface to receive feedback signaling including a channel change recommendation. The circuitry 25 may include a processing component 28 to determine whether to perform a first predetermined operation responsive to the channel change recommendation, and in response to determining to not perform the first predetermined operation, perform a second different predetermined action. One of the predetermined operations may include outputting a user notification for utilizing a user interface of a respective one of the sources to perform a channel change.

Figure 2:
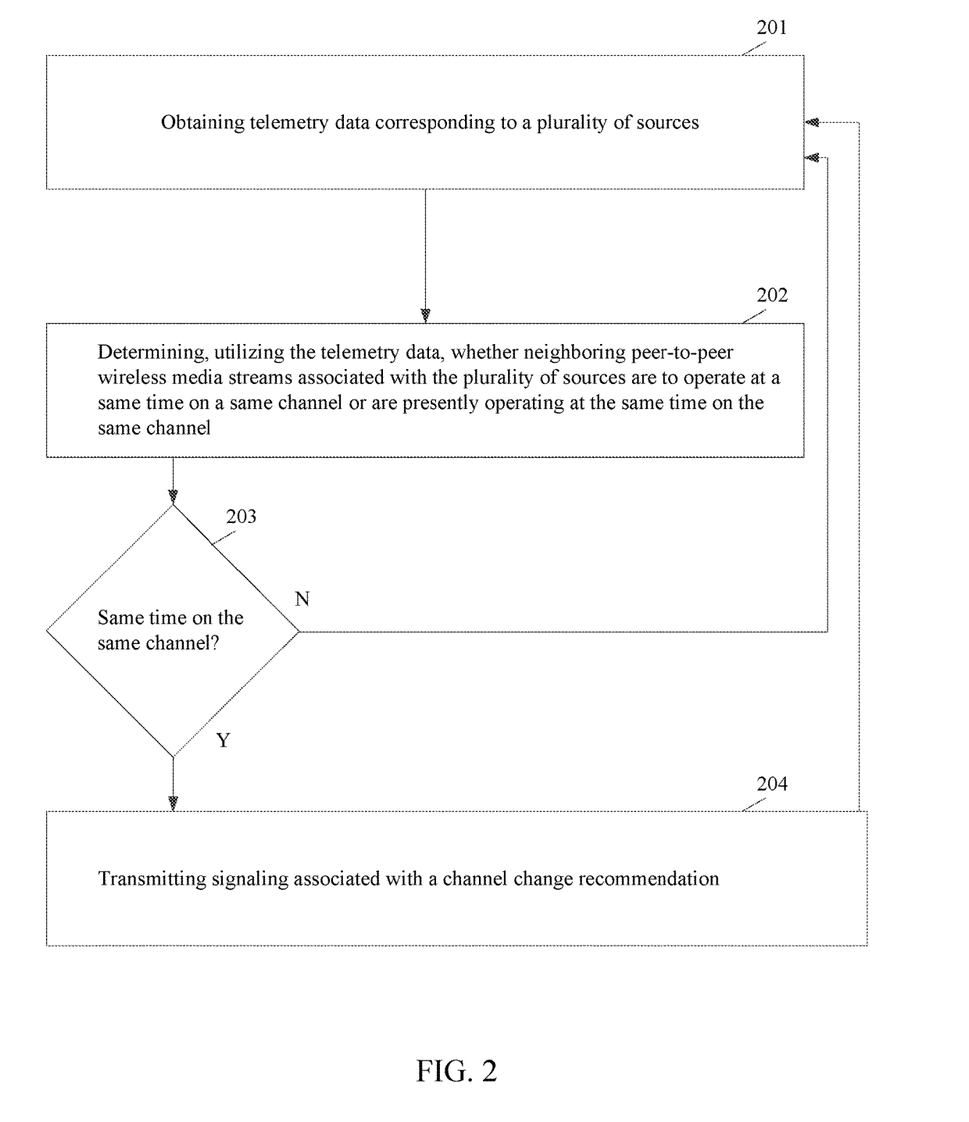
FIG. 2 illustrates operations that may performed by the circuitry of the network device of FIG. 1, according to some embodiments.

FIG. 2 illustrates operations that may performed by the circuitry of the network device of FIG. 1, according to some embodiments.

In block 201, the circuitry may obtain telemetry data corresponding to a plurality of sources. In an example, the telemetry data may indicate a geographical position of each AP of the plurality of APs. In an example, the telemetry data may include analytical information uploaded according to an interval. In an example, the telemetry data may include at least source location information, whether peer-to-peer wireless streaming media is being used, and WLAN and WPAN channel information.

In block 202, the circuitry may determine, utilizing the telemetry data, whether neighboring peer-to-peer wireless media streams associated with the plurality of sources are to operate at a same time on a same channel or are presently operating at the same time on the same channel. In an example, block 202 may include determining, utilizing the telemetry data, whether a first source-sink pair of corresponding source-sink pairs of the neighboring peer-to-peer wireless media streams is geographically positioned within a predetermined geographic distance from a second different source-sink pair of the source-sink pairs.

If the plurality of sources are to, or are, operating at the same time on the same channel in diamond 203, then in block 204 the circuitry may transmit signaling information associated with a channel change. For example, block 202 may include the circuitry signaling at least one of the sources of the plurality of sources responsive to determining that the first source-sink pair is geographically positioned within the predetermined geographic distance from the second source-sink pair.

Otherwise, at a later time, e.g. a next occurrence of the interval, next telemetry data may be obtained, and the circuitry may repeat the determination utilizing the next telemetry date.

In an example, the circuitry may identify a subset of the plurality of sources, and generating the channel change recommendation for only the identified subset of the plurality of sources to execute a channel change. The circuitry may include the recommendation in the signaling. In an example, the circuitry may select a target channel for the recommendation based on the telemetry data. In an example, the target channel includes a peer-to-peer wireless media channel.

In an example, the peer-to-peer wireless media channel includes at least one of a WiDi or Miracast channel. In an example, the target channel may include at least one of a Personal Area Network (PAN) channel or a Wireless Local Area Network (WLAN) channel. In an example, the target channel includes a WiFi channel.

In an example, the plurality of sources may include a plurality of Access Points (APs) corresponding to source-sink pairs of the neighboring peer-to-peer wireless media streams.

Figure 3:
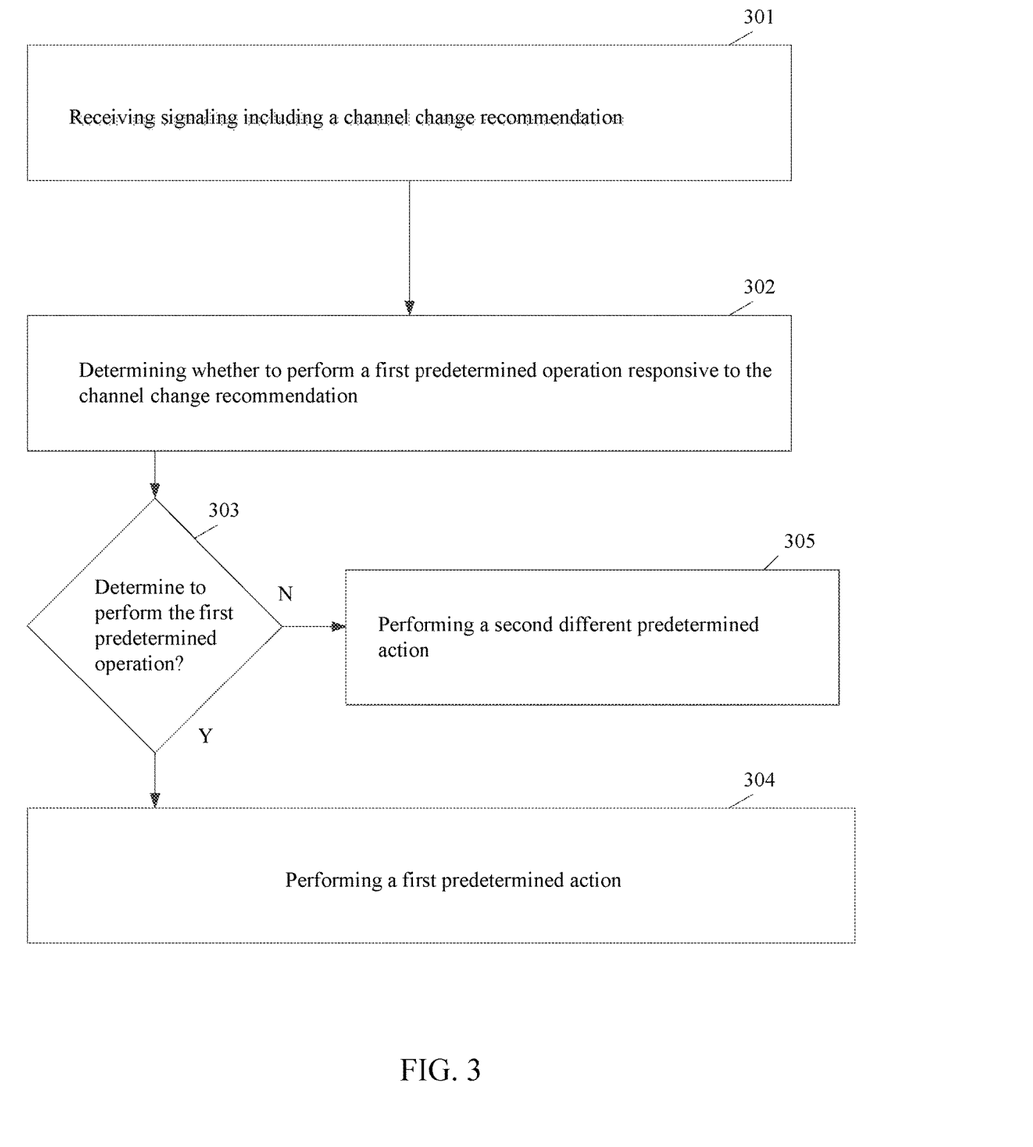
FIG. 3 illustrates operations that may be performed by the circuitry of the Access Points (APs) and/or the source/sink pairs of FIG. 1, according to some embodiments.

FIG. 3 illustrates operations that may be performed by the circuitry of the Access Points (APs) and/or the source/sink pairs of FIG. 1, according to some embodiments.

In block 301, the circuitry (e.g., circuitry 21 and/or circuitry 25) may receive signaling including a channel change recommendation. The signaling may be from a remote server. In block 302, the circuitry may determine whether to perform a first predetermined operation responsive to the channel change recommendation. In an example, determining whether to perform the first predetermined action may include ascertaining whether a network interface card associated with a respective one of the sources corresponds to a predetermined mode, and determining whether to perform the first predetermined operation based on a result of the ascertaining. In an example, the predetermined mode includes Dual Channel Mode (DCM).

In an example, the first predetermined operation may include performing a channel selection for an automatic or non-automatic channel change via a network interface card associated with a respective one of the sources. In another example, the first predetermined operation may include outputting a user notification for utilizing a user interface of a respective one of the sources to perform a channel change.

If the circuitry determines to perform the first predetermined operation in diamond 303, then in block 304 the circuitry may perform the first predetermined action. Otherwise, in block 305, the circuitry may perform a second predetermined action that is different than the first predetermined action. If the first predetermined action includes performing a channel selection for an automatic or non-automatic channel change via a network interface card associated with a respective one of the sources, the second predetermined action may include outputting a user notification for utilizing a user interface of a respective one of the sources to perform a channel change.

The operations described above may be all performed by circuitry 21 or 25, in an example. In another example, the operations may be distributed between circuitry 21 and 25. In such an example, any subset of the operations described above may be performed by one of circuitry 21 and 25, and the remaining subset of the operations described above may be performed by the other of the circuitry 21 and 25.

It should be appreciated that the operations described above (or described anywhere herein) are not limited to WiFi systems. In an example, the operations described above (or described anywhere herein) may be applied to other wireless streaming solutions that require high QoS. In other examples, the operations described above may be implemented with a wireless streaming solution that is not dependent on WiFi (for instance, wireless docking, such as wireless docking that uses 60 GHz).

Figure 4:
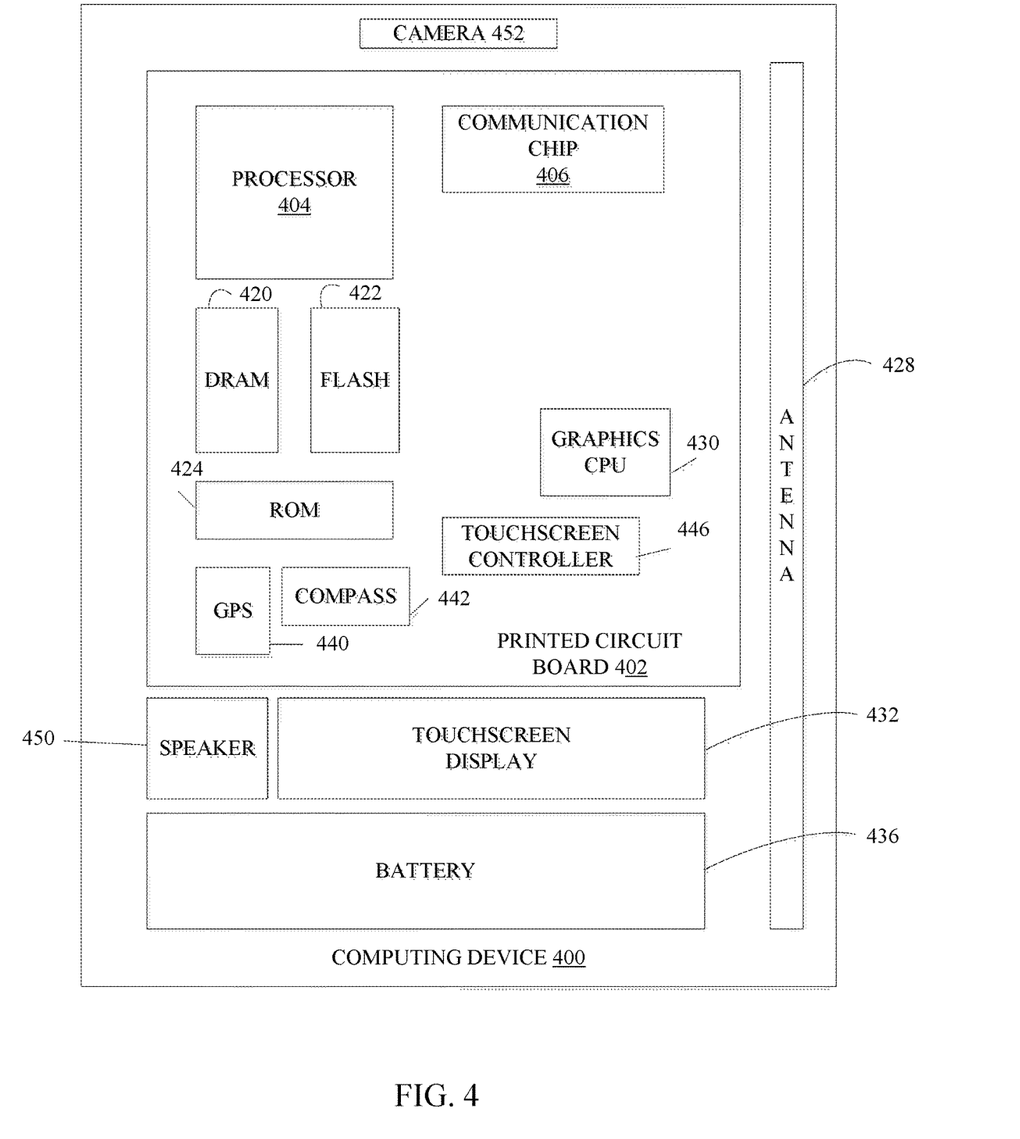
FIG. 4 illustrates an example computing device that may employ the telemetry adaptation apparatuses and/or methods described herein, according to some embodiments.

FIG. 4 illustrates an example computing device that may employ the telemetry adaptation apparatuses and/or methods described herein, according to some embodiments.

Example computing device 400 may employ the apparatuses and/or methods described herein, in accordance with various embodiments. As shown, computing device 400 may include a number of components, such as one or more processor(s) 404 (one shown) and at least one communication chip 406.

In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, a memory controller (not shown), volatile memory (e.g., dynamic random access memory (DRAM) 420), non-volatile memory such as read only memory (ROM) 424, flash memory 422, an I/O controller (not shown), a digital signal processor (not shown), a crypto processor (not shown), a graphics processor 430, one or more antenna 428, a display (not shown), a touch screen display 432, a touch screen controller 446, a battery 436, an audio codec (not shown), a video codec (not shown), a global positioning system (GPS) device 440, a compass 442, an accelerometer (not shown), a gyroscope (not shown), a speaker 450, a camera 452, and a mass storage device (such as hard disk drive, a solid state drive, compact disk (CD), digital versatile disk (DVD)) (not shown), and so forth.

In some embodiments, the one or more processor(s) 404, flash memory 422, and/or a storage device (not shown) may include associated firmware (not shown) storing programming instructions configured to enable computing device 400, in response to execution of the programming instructions by one or more processor(s) 404, to practice all or selected aspects of the methods of peer-to-peer wireless devices 15 and 16 and/or network device 10 of FIG. 1, described herein. In various embodiments, these aspects may additionally or alternatively be implemented using hardware separate from the one or more processor(s) 404, flash memory 412, or storage device 411.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth, and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 400 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

In an example, an apparatus to improve media streaming by telemetry based feedback is provided. The apparatus may include a telemetry data analyzer component to determine, using telemetry data corresponding to a plurality of sources, whether neighboring peer-to-peer wireless media streams associated with the plurality of sources are to operate at a same time on a same channel or are presently operating at the same time on the same channel; and a feedback component coupled to the telemetry data analyzer component, the feedback component to output a signal associated with a channel change recommendation in response to determining that the neighboring peer-to-peer wireless media streams are to operate at the same time on the same channel or are presently operating at the same time on the same channel.

In an example, the telemetry data analyzer component is to determine, utilizing the telemetry data, whether a first source-sink pair of corresponding source-sink pairs of the neighboring peer-to-peer wireless media streams is geographically positioned within a predetermined geographic distance from a second different source-sink pair of the source-sink pairs; and the feedback component is to output a signal for at least one of the sources of the plurality of sources if the first source-sink pair is geographically positioned within the predetermined geographic distance from the second source-sink pair.

In an example, the feedback component is to identify a subset of the plurality of sources; generate the channel change recommendation for only the identified subset of the plurality of sources to execute a channel change; and include the recommendation in the signal.

In an example, the feedback component is to select a target channel for the recommendation based on the telemetry data.

In an example, the target channel includes a peer-to-peer wireless media channel.

In an example, the peer-to-peer wireless media channel includes at least one of a WiDi or Miracast channel.

In an example, the target channel includes at least one of a Personal Area Network (PAN) channel or a Wireless Local Area Network (WLAN) channel.

In an example, the target channel includes a WiFi channel.

In an example, the plurality of sources comprise a plurality of Access Points (APs) corresponding to source-sink pairs of the neighboring peer-to-peer wireless media streams.

In an example, the telemetry data indicates a geographical position of each AP of the plurality of APs.

In an example, the telemetry data includes analytical information uploaded according to an interval.

In an example, the telemetry data includes at least source location information, whether peer-to-peer wireless streaming media is being used, and WLAN and WPAN channel information.

In an example, an apparatus to improve media streaming by telemetry based feedback is provided. The apparatus may include a network interface including a Wireless Local Area Network (WLAN) interface, the network interface to receive a feedback signal including a channel change recommendation; and a processing component to determine whether to perform a first predetermined operation responsive to the channel change recommendation; in response to determining to not perform the first predetermined operation, perform a second different predetermined operation; wherein one of the predetermined operations includes outputting a user notification for utilizing a user interface of a respective one of the sources to perform a channel change.

In an example, the other one of the predetermined operations includes performing a channel selection for an automatic or non-automatic channel change via a network interface card associated with a respective one of the sources.

In an example, the processing component is to ascertain whether a WLAN interface associated with a respective one of the sources corresponds to a predetermined mode; and determine whether to perform a first predetermined operation based on a result of the ascertaining.

In an example, the predetermined mode includes Dual Channel Mode (DCM).

In an example, a computer-readable medium to improve media streaming by telemetry based feedback is provided. The computer-readable medium has instructions stored thereon that, in response to execution by a processing device, cause the processing device to perform operations, to obtain telemetry data corresponding to a plurality of sources; determine, based on the telemetry data, whether neighboring peer-to-peer wireless media streams associated with the plurality of sources are to operate at a same time on a same channel or are presently operating at the same time on the same channel; and in response to a determination that the neighboring peer-to-peer wireless media streams are to operate at the same time on the same channel or are presently operating at the same time on the same channel, transmit signaling associated with a channel change recommendation.

In an example, the operations are further to determine, based on the telemetry data, whether a first source-sink pair of corresponding source-sink pairs of the neighboring peer-to-peer wireless media streams is geographically positioned within a predetermined geographic distance from a second different source-sink pair of the source-sink pairs; and signal at least one of the sources of the plurality of sources responsive to a determination that the first source-sink pair is geographically positioned within the predetermined geographic distance from the second source-sink pair.

In an example, the operations are further to identify a subset of the plurality of sources; generate the channel change recommendation for only the identified subset of the plurality of sources to execute a channel change; and include the recommendation in the signaling.

In an example, the operations are further to select a target channel for the recommendation based on the telemetry data.

In an example, the target channel includes at least one of a Personal Area Network (PAN) channel or a Wireless Local Area Network (WLAN) channel.

In an example, the target channel includes a WiFi channel.

In an example, the target channel includes a peer-to-peer wireless media channel.

In an example, the peer-to-peer wireless media channel includes at least one of a WiDi or Miracast channel.

In an example, the plurality of sources comprise a plurality of Access Points (APs) corresponding to source-sink pairs of the neighboring peer-to-peer wireless media streams.

In an example, the telemetry data indicates a geographical position of each AP of the plurality of APs.

In an example, the telemetry data includes analytical information uploaded according to an interval.

In an example, the telemetry data includes at least source location information, whether peer-to-peer wireless streaming media is being used, and WLAN and WPAN channel information.

In an example, a computer-readable medium to improve media streaming by telemetry based feedback is provided. In an example, the computer-readable medium has instructions stored thereon that, in response to execution by a processing device, cause the processing device to perform operations, to receive signaling associated with a remote server, the signaling including a channel change recommendation; determine whether to perform a first predetermined operation responsive to the channel change recommendation; and in response to a determination to not perform the first predetermined operation, perform a second different predetermined operation; wherein one of the predetermined operations includes output a user notification for utilization of a user interface of a respective one of the sources to perform a channel change.

In an example, the other one of the predetermined operations includes perform a channel selection for an automatic or non-automatic channel change via a network interface card associated with a respective one of the sources.

In an example, the operations are further to ascertain whether a network interface card associated with a respective one of the sources corresponds to a predetermined mode; and determine whether to perform a first predetermined operation based on a result of the ascertaining.

In an example, the predetermined mode includes Dual Channel Mode (DCM).

In an example, a method of improve media streaming by telemetry based feedback is provided. The method may include obtaining telemetry data corresponding to a plurality of sources; determining, utilizing the telemetry data, whether neighboring peer-to-peer wireless media streams associated with the plurality of sources are to operate at a same time on a same channel or are presently operating at the same time on the same channel; and in response to determining that the neighboring peer-to-peer wireless media streams are to operate at the same time on the same channel or are presently operating at the same time on the same channel, transmitting signaling associated with a channel change recommendation.

In an example, the method may include determining, utilizing the telemetry data, whether a first source-sink pair of corresponding source-sink pairs of the neighboring peer-to-peer wireless media streams is geographically positioned within a predetermined geographic distance from a second different source-sink pair of the source-sink pairs; and signaling at least one of the sources of the plurality of sources responsive to determining that the first source-sink pair is geographically positioned within the predetermined geographic distance from the second source-sink pair.

In an example, the method may include identifying a subset of the plurality of sources; generating the channel change recommendation for only the identified subset of the plurality of sources to execute a channel change; and including the recommendation in the signaling.

In an example, the method may include selecting a target channel for the recommendation based on the telemetry data.

In an example, the target channel includes at least one of a Personal Area Network (PAN) channel or a Wireless Local Area Network (WLAN) channel.

In an example, the target channel includes a WiFi channel.

In an example, the target channel includes a peer-to-peer wireless media channel.

In an example, the peer-to-peer wireless media channel includes at least one of a WiDi or Miracast channel.

In an example, the plurality of sources comprise a plurality of Access Points (APs) corresponding to source-sink pairs of the neighboring peer-to-peer wireless media streams.

In an example, the telemetry data indicates a geographical position of each AP of the plurality of APs.

In an example, the telemetry data includes analytical information uploaded according to an interval.

In an example, the telemetry data includes at least source location information, whether peer-to-peer wireless streaming media is being used, and WLAN and WPAN channel information.

In an example, a method of improving media streaming by telemetry based feedback is provided. The method may include receiving signaling associated with a remote server, the signaling including a channel change recommendation; determining whether to perform a first predetermined operation responsive to the channel change recommendation; in response to determining to not perform the first predetermined operation, performing a second different predetermined operation. The predetermined operations may include outputting a user notification for utilizing a user interface of a respective one of the sources to perform a channel change.

In an example, the other one of the predetermined operations may include performing a channel selection for an automatic or non-automatic channel change via a network interface card associated with a respective one of the sources.

In an example, the method may include ascertaining whether a network interface card associated with a respective one of the sources corresponds to a predetermined mode; and determining whether to perform a first predetermined operation based on a result of the ascertaining.

In an example, the predetermined mode includes Dual Channel Mode (DCM).

In an example, an apparatus to improve media streaming by telemetry based feedback is provided. In an example, the apparatus may include means for obtaining telemetry data corresponding to a plurality of sources; means for determining, utilizing the telemetry data, whether neighboring peer-to-peer wireless media streams associated with the plurality of sources are to operate at a same time on a same channel or are presently operating at the same time on the same channel; and means for transmitting signaling associated with a channel change recommendation in response to determining that the neighboring peer-to-peer wireless media streams are to operate at the same time on the same channel or are presently operating at the same time on the same channel.

In an example, the apparatus may include means for determining, utilizing the telemetry data, whether a first source-sink pair of corresponding source-sink pairs of the neighboring peer-to-peer wireless media streams is geographically positioned within a predetermined geographic distance from a second different source-sink pair of the source-sink pairs; and means for signaling at least one of the sources of the plurality of sources responsive to determining that the first source-sink pair is geographically positioned within the predetermined geographic distance from the second source-sink pair.

In an example, the apparatus may include means for identifying a subset of the plurality of sources; means for generating the channel change recommendation for only the identified subset of the plurality of sources to execute a channel change; and means for including the recommendation in the signaling.

In an example, the apparatus may include means for selecting a target channel for the recommendation based on the telemetry data.

In an example, the target channel includes at least one of a Personal Area Network (PAN) channel or a Wireless Local Area Network (WLAN) channel.

In an example, the target channel includes a WiFi channel.

In an example, the target channel includes a peer-to-peer wireless media channel.

In an example, the peer-to-peer wireless media channel includes at least one of a WiDi or Miracast channel.

In an example, the plurality of sources comprise a plurality of Access Points (APs) corresponding to source-sink pairs of the neighboring peer-to-peer wireless media streams.

In an example, the telemetry data indicates a geographical position of each AP of the plurality of APs.

In an example, the telemetry data includes analytical information uploaded according to an interval.

In an example, the telemetry data includes at least source location information, whether peer-to-peer wireless streaming media is being used, and WLAN and WPAN channel information.

In an example, an apparatus to improve media streaming by telemetry based feedback is provided. The apparatus may include means for receiving signaling associated with a remote server, the signaling including a channel change recommendation; means for determining whether to perform a first predetermined operation responsive to the channel change recommendation; means for performing a second different predetermined operation in response to determining to not perform the first predetermined operation. In an example, one of the predetermined operations includes outputting a user notification for utilizing a user interface of a respective one of the sources to perform a channel change.

In an example, the apparatus may include means for ascertaining whether a network interface card associated with a respective one of the sources corresponds to a predetermined mode; and means for determining whether to perform a first predetermined operation based on a result of the ascertaining.

In an example, the predetermined mode includes Dual Channel Mode (DCM).

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
    a telemetry data analyzer circuit component to determine, using telemetry data including first telemetry data received from a first access point (AP) and second telemetry data received from a second access point (AP), whether neighboring peer-to-peer wireless media streams including a first peer-to-peer wireless media stream and a second peer-to-peer wireless media stream are to operate at a same time on a same channel or are presently operating at the same time on the same channel, wherein the first peer-to-peer wireless media stream is transmitted and received between devices of a first source-sink pair and the second peer-to-peer wireless media stream is transmitted and received between devices of a second source-sink pair, wherein the first telemetry data includes identifying channel information on which the devices of the first source-sink pair transmit and receive the first peer-to-peer wireless media stream and the second telemetry data includes identifying channel information on which devices of the second source-sink pair transmit and receive the second peer-to-peer wireless media stream; and
    a feedback circuit component coupled to the telemetry data analyzer circuit component, to output a signal associated with a channel change recommendation in response to determining that the first peer-to-peer wireless media stream and the second peer-to-peer wireless media stream are to operate at the same time on the same channel or are presently operating at the same time on the same channel and include the channel change recommendation in the signal, wherein the channel change recommendation includes a recommendation that is based at least in part on a geographical position of the first source-sink pair relative to the second source-sink pair.

2. The apparatus of claim 1, wherein the telemetry data analyzer circuit component is to determine, utilizing the telemetry data, whether the first source- sink pair corresponding to the first access point (AP) is geographically positioned within a predetermined geographic distance from the second source-sink pair of the source-sink pairs corresponding to the second access point (AP); and
    the feedback circuit component is to output a signal for at least one of the first AP or the second AP, if the first source-sink pair is geographically positioned within the predetermined geographic distance from the second source-sink pair.

3. The apparatus of claim 1, wherein the first access point (AP) and the second access point (AP) are included in a plurality of sources and include one of the devices of the first or the second source-sink pair, and the feedback circuit component is to:
    identify the first AP and the second AP as a subset of the plurality of sources;
    generate the channel change recommendation for only the identified subset of the plurality of sources to execute a channel change; and
    include the recommendation in the signal.

4. The apparatus of claim 3, wherein the feedback circuit component is to select a target channel for the recommendation based on the telemetry data.

5. The apparatus of claim 4, wherein the target channel includes a peer-to-peer wireless media channel.

6. The apparatus of claim 5, wherein the peer-to-peer wireless media channel includes at least one of a WiDi or Miracast channel.

7. The apparatus of claim 4, wherein the target channel includes at least one of a Personal Area Network (PAN) channel or a Wireless Local Area Network (WLAN) channel.

8. The apparatus of claim 4, wherein the target channel includes a WiFi channel.

9. The apparatus of claim 1, wherein the telemetry data indicates a geographical position of each AP of a plurality of sources.

10. The apparatus of claim 1, wherein the telemetry data includes analytical information uploaded according to an interval.

11. The apparatus of 10, wherein the telemetry data includes at least source location information, whether peer-to-peer wireless streaming media is being used, and WLAN and WPAN channel information.

12. A non-transitory computer-readable medium to improve media streaming by telemetry based feedback, the computer-readable medium having instructions stored thereon that, in response to execution by a processing device, cause the processing device to perform operations, to:
    obtain telemetry data corresponding to a plurality of sources, wherein the plurality of sources includes a first access point (AP) and a second access point (AP) and the telemetry data includes first telemetry data received from the first AP and second telemetry data received from the second AP;
    determine, based on the telemetry data, whether neighboring peer-to-peer wireless media streams including a first peer-to-peer wireless media stream and a second peer-to-peer wireless media stream are to operate at a same time on a same channel or are presently operating at the same time on the same channel, wherein the first telemetry data includes identifying channel information on which devices of a first source-sink pair transmit and receive the first peer-to-peer wireless media stream and the second telemetry data includes identifying channel information on which devices of a second source-sink pair transmit and receive the second peer-to-peer wireless media stream; and
    in response to a determination that the neighboring peer-to-peer wireless media streams are to operate at the same time on the same channel or are presently operating at the same time on the same channel, transmit signaling associated with a channel change recommendation that is based on at least in part a geographical position of the first source-sink pair relative to the second source-sink pair.

13. The non-transitory computer-readable medium of claim 12, wherein the operations are further to:
   determine, based on the telemetry data, whether the first source-sink pair is geographically positioned within a predetermined geographic distance from the second source-sink pair; and
   signal at least one of the sources of the plurality of sources responsive to a determination that the first source-sink pair is geographically positioned within the predetermined geographic distance from the second source-sink pair.

14. The non-transitory computer-readable medium of claim 12, wherein the operations are further to:
   identify a subset of the plurality of sources including the first access point (AP) and the second access point (AP) and wherein the plurality of sources include a device of the first or the second source-sink pair;
   generate the channel change recommendation for only the identified subset of the plurality of sources to execute a channel change; and
   include the recommendation in the signaling.

15. The non-transitory computer-readable medium of claim 14, wherein the operations are further to:
   select a target channel for the recommendation based on the telemetry data.

16. The computer-readable medium of claim 15, wherein the target channel includes at least one of a Personal Area Network (PAN) channel, a Wireless Local Area Network (WLAN) channel, a WiFi channel, or a peer-to-peer wireless media channel that includes at least one of a WiDi or Miracast channel.

17. The non-transitory computer-readable medium of claim 12, wherein the plurality of sources comprise a plurality of access points (APs) corresponding to source-sink pairs of the neighboring peer-to-peer wireless media streams.

18. The non-transitory computer-readable medium of claim 17, wherein the telemetry data indicates a geographical position of each AP of the plurality of APs and includes analytical information uploaded according to an interval; and wherein the telemetry data includes at least source location information, whether peer-to-peer wireless streaming media is being used, and WLAN and WPAN channel information.

* * * * *